(12) United States Patent
Ellis

(10) Patent No.: US 10,951,855 B2
(45) Date of Patent: *Mar. 16, 2021

(54) REMOTELY ACCESSED VIRTUAL RECORDING ROOM

(71) Applicant: Onstream Media Corporation, Pompano Beach, FL (US)

(72) Inventor: Gregory Duane Ellis, Orem, UT (US)

(73) Assignee: Onstream Media Corporation, Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/874,991

(22) Filed: May 15, 2020

(65) Prior Publication Data

US 2020/0280695 A1 Sep. 3, 2020

Related U.S. Application Data

(63) Continuation of application No. 16/865,756, filed on May 4, 2020, now Pat. No. 10,848,707, which is a
(Continued)

(51) Int. Cl.
*H04N 5/77* (2006.01)
*H04N 7/173* (2011.01)
(Continued)

(52) U.S. Cl.
CPC .......... *H04N 5/77* (2013.01); *G11B 27/031* (2013.01); *H04N 7/17318* (2013.01);
(Continued)

(58) Field of Classification Search
CPC .... H04N 5/77; H04N 21/6581; H04N 21/231; H04N 21/2747; H04N 21/6587;
(Continued)

(56) References Cited

U.S. PATENT DOCUMENTS

| | | | |
|---|---|---|---|
| 5,778,181 A | 7/1998 | Hidary et al. | |
| 5,982,362 A | 11/1999 | Crater et al. | |

(Continued)

FOREIGN PATENT DOCUMENTS

| | | |
|---|---|---|
| CA | 2344595 A1 | 12/2001 |
| EP | 0961490 A2 | 12/1999 |

(Continued)

OTHER PUBLICATIONS

Bond, et al., Streaming audio with synchronized transcripts utilizing SMIL, Library Hi Tech, vol. 24, No. 3, 2006, pp. 452-462.
(Continued)

*Primary Examiner* — Kunal Langhnoja
(74) *Attorney, Agent, or Firm* — Plumsea Law Group, LLC

(57) ABSTRACT

An audio/video stream recording, storage, and delivery system 10 utilizes an Internet-based browser connection. The system 10 includes recording software 20, storage memory 30, a code generator 40, and a user interface 50. Preferably, the recording software 20 is located on the host back end 60 where it processes and records audio and video material that originates from the user front end 70 and is streamed to the host back end. The storage memory 30, which is also located on the host back end 60, stores the recorded audio and video material. The user interface 50 to the system provides a user located at the user front end 70 with remote access to a virtual recording room. The user interface 50 further enables the user to record audio and video material streamed from the user front end 70 by activating the recording software 20 located on the host back end 60. This is accomplished without requiring recording functionality on the user front end 70. The code generator 30 produces code associated with the recorded audio and video material. This code can be easily copied and pasted to an
(Continued)

additional location 80, such as an auction website. Activating the code pasted at the additional location 80 provides access to the recorded audio and video material from the additional location while allowing the recorded audio and video material to remain stored at the host back end 60.

30 Claims, 4 Drawing Sheets

Related U.S. Application Data continuation of application No. 16/542,570, filed on Aug. 16, 2019, now Pat. No. 10,694,142, which is a continuation of application No. 16/048,761, filed on Jul. 30, 2018, now Pat. No. 10,674,109, which is a continuation of application No. 14/843,457, filed on Sep. 2, 2015, now Pat. No. 10,038,930, which is a continuation of application No. 10/808,894, filed on Mar. 24, 2004, now Pat. No. 9,161,068.

(51) Int. Cl.
| | |
|---|---|
| *H04N 21/4143* | (2011.01) |
| *H04N 21/475* | (2011.01) |
| *H04N 21/658* | (2011.01) |
| *H04N 21/6587* | (2011.01) |
| *H04N 21/2543* | (2011.01) |
| *H04N 21/2747* | (2011.01) |
| *H04N 21/231* | (2011.01) |
| *H04N 21/232* | (2011.01) |
| *H04N 21/4782* | (2011.01) |
| *H04N 21/61* | (2011.01) |
| *H04N 21/643* | (2011.01) |
| *G11B 27/031* | (2006.01) |

(52) U.S. Cl.
CPC ......... *H04N 21/231* (2013.01); *H04N 21/232* (2013.01); *H04N 21/2543* (2013.01); *H04N 21/2747* (2013.01); *H04N 21/4143* (2013.01); *H04N 21/4753* (2013.01); *H04N 21/4782* (2013.01); *H04N 21/6125* (2013.01); *H04N 21/64322* (2013.01); *H04N 21/6581* (2013.01); *H04N 21/6587* (2013.01)

(58) Field of Classification Search
CPC ............. H04N 21/4143; H04N 21/232; H04N 21/6125; H04N 21/64322; H04N 21/4782; H04N 21/4753; H04N 21/2543; H04N 7/17318; G11B 27/031
See application file for complete search history.

(56) References Cited

U.S. PATENT DOCUMENTS

| | | | |
|---|---|---|---|
| 5,983,005 A | 11/1999 | Monteiro et al. | |
| 6,182,116 B1 | 1/2001 | Namma et al. | |
| 6,389,473 B1 | 5/2002 | Carmel et al. | |
| 6,421,726 B1 | 7/2002 | Kenner et al. | |
| 6,496,980 B1 | 12/2002 | Tillman et al. | |
| 6,535,909 B1 | 3/2003 | Rust | |
| 6,564,380 B1 | 5/2003 | Murphy | |
| 6,601,136 B2 | 7/2003 | Gunaseelan et al. | |
| 6,621,834 B1 | 9/2003 | Scherpbier et al. | |
| 6,636,888 B1 | 10/2003 | Bookspan et al. | |
| 6,698,021 B1* | 2/2004 | Amini | G08B 13/19656 |
| | | | 348/143 |
| 6,711,622 B1 | 3/2004 | Fuller et al. | |
| 7,069,573 B1 | 6/2006 | Brooks et al. | |
| 7,089,319 B2 | 8/2006 | Lysenko et al. | |
| 7,103,668 B1 | 9/2006 | Corley et al. | |
| 7,205,891 B1* | 4/2007 | McGlothlin | H04L 65/602 |
| | | | 340/539.25 |
| 7,257,158 B1 | 8/2007 | Figueredo et al. | |
| 7,281,035 B2 | 10/2007 | Ihara et al. | |
| 7,328,239 B1 | 2/2008 | Berberian et al. | |
| 7,330,875 B1 | 2/2008 | Parasnis et al. | |
| 7,412,531 B1 | 8/2008 | Lango et al. | |
| 7,451,467 B2 | 11/2008 | Carver et al. | |
| 7,558,221 B2 | 7/2009 | Nelson et al. | |
| 7,665,114 B2 | 2/2010 | Safran et al. | |
| 7,730,407 B2 | 6/2010 | Chiu et al. | |
| 7,849,207 B2 | 12/2010 | Kazmi et al. | |
| 8,387,099 B2 | 2/2013 | Perlman et al. | |
| 8,510,441 B2 | 8/2013 | Ooi et al. | |
| 9,161,068 B2 | 10/2015 | Ellis | |
| 9,467,728 B2 | 10/2016 | Ellis | |
| 9,942,525 B2* | 4/2018 | Duffy | H04N 5/77 |
| 10,038,930 B2 | 7/2018 | Ellis | |
| 10,200,648 B2 | 2/2019 | Ellis | |
| 2001/0027474 A1 | 10/2001 | Nachman et al. | |
| 2001/0027475 A1 | 10/2001 | Givol et al. | |
| 2001/0027493 A1 | 10/2001 | Wallace | |
| 2001/0044826 A1* | 11/2001 | Ludwig | G06F 15/16 |
| | | | 709/204 |
| 2001/0052019 A1* | 12/2001 | Walters | G06Q 30/06 |
| | | | 709/231 |
| 2002/0046407 A1* | 4/2002 | Franco | H04N 21/6543 |
| | | | 725/110 |
| 2002/0049977 A1 | 4/2002 | Miller et al. | |
| 2002/0056123 A1* | 5/2002 | Liwerant | H04M 7/0039 |
| | | | 725/87 |
| 2002/0069420 A1 | 6/2002 | Russell et al. | |
| 2002/0073205 A1 | 6/2002 | Mostafa | |
| 2002/0078445 A1 | 6/2002 | Sharif et al. | |
| 2002/0078454 A1 | 6/2002 | Auberger | |
| 2002/0095679 A1 | 7/2002 | Bonini | |
| 2002/0143798 A1 | 10/2002 | Lisiecki et al. | |
| 2002/0143886 A1 | 10/2002 | Camens | |
| 2003/0046702 A1 | 3/2003 | Sasaki | |
| 2003/0122922 A1 | 7/2003 | Saffer et al. | |
| 2004/0032348 A1 | 2/2004 | Lai et al. | |
| 2004/0205131 A1 | 10/2004 | Saruhashi et al. | |
| 2004/0217984 A1 | 11/2004 | Borden, IV | |
| 2004/0225728 A1 | 11/2004 | Huggins et al. | |
| 2004/0230655 A1 | 11/2004 | Li et al. | |
| 2004/0236844 A1 | 11/2004 | Kocherlakota | |
| 2004/0249965 A1 | 12/2004 | Huggins et al. | |
| 2004/0252197 A1 | 12/2004 | Fraley et al. | |
| 2004/0257431 A1 | 12/2004 | Girish et al. | |
| 2004/0260759 A1 | 12/2004 | Smoliar et al. | |
| 2005/0064378 A1 | 3/2005 | Toly | |
| 2005/0125541 A1 | 6/2005 | Frank et al. | |
| 2005/0188007 A1 | 8/2005 | Warner et al. | |
| 2006/0010199 A1* | 1/2006 | Brailean | H04L 67/18 |
| | | | 709/204 |
| 2007/0073840 A1 | 3/2007 | O'Brien et al. | |
| 2007/0106682 A1 | 5/2007 | Frank | |
| 2016/0035195 A1* | 2/2016 | Renkis | H04W 12/02 |
| | | | 348/143 |

FOREIGN PATENT DOCUMENTS

| | | |
|---|---|---|
| EP | 1379048 A1 | 7/2002 |
| JP | 2002238039 A | 8/2002 |
| JP | 2002344920 A | 11/2002 |
| JP | 2003030105 A | 1/2003 |
| JP | 2003037830 A | 2/2003 |
| JP | 2003091472 A | 3/2003 |
| JP | 2003153248 A | 5/2003 |
| JP | 2003259327 A | 9/2003 |
| JP | 2003333575 A | 11/2003 |
| JP | 2004015183 A | 1/2004 |
| KR | 20010092982 | 10/2001 |
| WO | 2001014981 A1 | 3/2001 |
| WO | 20010114981 A1 | 3/2001 |
| WO | 200191417 A2 | 11/2001 |

(56) References Cited

FOREIGN PATENT DOCUMENTS

| WO | 2002054698 A2 | 7/2002 |
|---|---|---|
| WO | 2002079905 A2 | 10/2002 |

OTHER PUBLICATIONS

Lutz, et al., Evolving an in-house system to integrate the management of digital collections, Library Hi Tech, vol. 24, No. 2, 2006, pp. 241.
Whitney, L.A. Times, KTLA team up with BOT, Electronic Media, vol. 21, No. 36, 2002, pp. 10.
IxMicro offers technology solutions for video streaming to enhance training and learning, Information Today, vol. 15, No. 6, 1998, pp. 37,42.
KMWorld, vol. 14, No. 9, 2005, pp. SS4.
Your Own TV Station . . . Almost—Corporations are using video services on their Web sites to quickly post newscasts and other information (The corporate online video services market is growing, almost to $1 bil), InternetWeek, Sep. 10, 2001, pp. 20.
Woods, Is It Live or Is It Digital Video?—No longer confined to a tiny window, high-quality digital video, distributed over networks, is filling screens on the desktop, and in hospitals, casinos and even movie theaters. (Technology Information), Network Computing, Jul. 9, 2001, pp. 40.
Leading Newspaper Web Sites Stream Video With WorldNow Technology: Publishers Open New Video Revenue Opportunity With WorldNow, PR Newswire, Oct. 26, 2004.
Liu, et al., Automating Camera Management for Lecture Room Environments, CHI 2001, vol. 3, No. 1, pp. 442-449.
Chandra, Lecture Video Capture for the Masses, ItiSCE 2007, pp: 276-280.
Vonolfen, Virtual Studies for TV Productions—Limits and Chances, GMD—Institute for Media Communication.
Redensburg, et al., Distributing Virtual Worlds in a Teleteaching Environment, German National Research Center for Information Technology.
Kaul, et al., Distributed Video Production over ATM, ECMAST '96, GMD—German National Research Center for Information Technology.
Joukov, et al., Lectern II: A Multimedia Lecture Capturing and Editing System, Computer Science Department, State University of New York at Stony Brook.
Liao, et al., A New Cluster-based Distribution Video Recorder Server, Huazhong University of Science and Technology.
Naegele-Jackson, et al., Distributed Television Production for Distance Education with a Customizable Internet Platform, IEEE, 2001, pp. 838-842.
Chan, et al., Distributed Servers Architecture for Networked Video Services, IEEE, vol. 9, No. 2, Apr. 2001, pp. 125-136.
Tsutsumi, Real Time Storage and Simultaneous Retrieval for Surveillance and Patrol Video, IEEE, 2000, pp. 1175-1178.
Kaul et al., Studio on Demand by Distributed Video Production over ATM, Internet Broadcasting Convention, Sep. 1996, IEEE, pp. 161-166.
Wu, et al., On Scalable Design of an ATM-based Video Server, IEEE, 1996, pp. 1335-1340.
2002, PR Newswire, Mar. 4, 2002, http://search.proquest.com/docview/447715120?accountid=14753, accessed Feb. 12, 2015.
MessageBay, A Software Company: Web & Wireless Messaging—Overview, Web Page Dec. 8, 2003, (http://www.messagebay.com/prodtech/prodtech.php> 1 page.
EVision: Overview of Our Services—Dec. 8, 2003, <http://www.4evision.com/services.html> 1 page.
TechTV Interact: Add Video to your Website, by Kino-Kevin Ramsey, Dec. 8, 2003, (http://www.techtv.com/interact./netcamnetwork/story/0,23350,2232930,00.html> 2 pages.
TechTV Interact: Add Video to your Website, by Kino-Kevin Ramsey, Feb. 29, 2004, (http://www.techtv.com/interact/netcamnetwork/story/0,23350,2232930,00.html> 2 pages.
CCTVWholesalers.com by Kinder Guard, LLC: Digital Video Recorders with Remote Video Monitoring, Dec. 8, 2003, (http://www.kinderguard.net/digital-recorders-remote-video-monitoring/digital-video-recorders> 4 pages.
CCTVWholesalers.com by Kinder Guard, LLC: Digital Video Recorders with Remote Video Monitoring, Tech Tip, Dec. 8, 2003, <http://www.kinderguard.net/remotevideomonitoring/remotevideomonitoring.html> 4 pages.
PySoft Broadcaster, The Tool for Delivering Audio and Video Content by Py Software, Useful & Functional Software for your PC, Dec. 8, 2003, <http://www.pysoft.com/Broadcaster.html> 3 pages.
Buy.com: Product Information Page for Linksys WVC11B Wireless-B Internet Video Camera, Dec. 8, 2003, (http://www.buy.com/retail/computers/product.asp?loc=15681&sku=90126833> 2 pages.
FileFlash: C:\internet\Web\Cameras, Dec. 8, 2003, <http://www.fileflash.com/?action=categories&category=104> 4 pages.
TuttoGratis: Jmeeting: Free online video chatroom! Dec. 8, 2003, <http://free.tuttogratis.com/special.htm?id=62&r=free_internet_services1> 2 pages.
Adobe GoLive6: 46th Grammy Awards Charity Auction to Benefit MusiCares, Feb. 29, 2004, (http://www.kompoltandcompany.com/auctionpics/grammy04/listings/59.html> 4 pages.
SoftLandMark: India's Premier Website for Best Freeware and Shareware Downloads—Video MPEG Capture and Web Cam Tools p. 2, Dec. 28, 2003, <http://www.softlandmark.com/VideoCapture1.htm> 4 pages.
SoftLandMark: India's Premier Website for Best Freeware and Shareware Downloads—Video MPEG Capture and Web Cam Tools p. 1, Dec. 28, 2003, <http://www.softlandmark.com/VideoCapture.htm> 4 pages.
VideoSnap—Logitech: Support—FAQ, Dec. 8, 2003, <http://videosnap.logitech.com/support.jsp> 2 pages.
FreeDownloads Center: Network and Internet/Video Chat Tools—Dec. 8, 2003, (http://www.freedownloadscenter.com/Network_andInternet/Video_Chat_Tools/> 2 pages.
Webam Software: List of Various WebCam Software—Dec. 8, 2003, <http://www.winappslist.com/multimedia/webcam.htm> 3 pages.
SiliconValleyInternet.com: Article regarding Launch of Video E-Mail Service by Yahoo, by Michael Singer, Dec. 8, 2003, <http://siliconvalley.internet.com/news/article.php/928801> 3 pages.
Petition for Inter Partes Review of U.S. Pat. No. 9,161,068 (Claims 1-34), and Petitioner Facebook, Inc.'s Ranking and Explanation for Two Petitions Challenging U.S. Pat. No. 9,161,068, filed Aug. 27, 2020.
Declaration of Dr. Henry Houh, from Petition for Inter Partes Review of U.S. Pat. No. 9,161,068 (Claims 1-34), filed Aug. 27, 2020.
Declaration of Dr. Ingrid Hsieh-Yee (with exhibits), from Petition for Inter Partes Review of U.S. Pat. No. 9,161,068 (Claims 1-34), filed Aug. 27, 2020.
Petition for Inter Partes Review of U.S. Pat. No. 9,161,068 (Claims 35-60), and Petitioner Facebook, Inc.'s Ranking and Explanation for Two Petitions Challenging U.S. Pat. No. 9,161,068, filed Aug. 27, 2020.
Declaration of Dr. Henry Houh, from Petition for Inter Partes Review of U.S. Pat. No. 9,161,068 (Claims 35-60), filed Aug. 27, 2020.
Declaration of Dr. Ingrid Hsieh-Yee (with exhibits), from Petition for Inter Partes Review of U.S. Pat. No. 9,161,068 (Claims 35-60), filed Aug. 27, 2020.
Petition for Inter Partes Review of U.S. Pat. No. 9,467,728, filed Aug. 27, 2020.
Declaration of Dr. Henry Houh, from Petition for Inter Partes Review of U.S. Pat. No. 9,467,728, filed Aug. 27, 2020.
Declaration of Dr. Ingrid Hsieh-Yee (with exhibits), from Petition for Inter Partes Review of U.S. Pat. No. 9,467,728, filed Aug. 27, 2020.
Petition for Inter Partes Review of U.S. Pat. No. 10,200,648, filed Aug. 27, 2020.
Declaration of Dr. Henry Houh, from Petition for Inter Partes Review of U.S. Patent No. 10,200,648, filed Aug. 27, 2020.

(56) References Cited

OTHER PUBLICATIONS

Declaration of Dr. Ingrid Hsieh-Yee (with exhibits), from Petition for Inter Partes Review of U.S. Pat. No. 10,200,648, filed Aug. 27, 2020.
Petition for Inter Partes Review of U.S. Pat. No. 10,038,930, filed Aug. 27, 2020.
Declaration of Dr. Henry Houh, from Petition for Inter Partes Review of U.S. Pat. No. 10,038,930, filed Aug. 27, 2020.
Declaration of Dr. Ingrid Hsieh-Yee (with exhibits), from Petition for Inter Partes Review of U.S. Pat. No. 10,038,930, filed Aug. 27, 2020.
Curriculum Vitae of Dr. Henry Houh, from Petitions for Inter Partes Review of U.S. Pat. Nos. 9,161,068; 9,467,728; 10,200,648; and 10,038,930, filed Aug. 27, 2020.
Curriculum Vitae of Dr. Ingrid Hsieh-Yee, from Petitions for Inter Partes Review of U.S. Pat. Nos. 9,161,068; 9,467,728; 10,200,648; and 10,038,930, filed Aug. 27, 2020.
"Defendant Facebook, Inc.'s Preliminary Invalidity Contentions," dated Aug. 28, 2020, from *Onstream Media Corporation v. Facebook, Inc.*, United States District Court, Western District of Texas, Austin Division, Case No. 1:20-cv-00214-ADA (3393 pages).
Gaglianello, Robert D. et al., "Montage: Continuous Presence Teleconferencing Utilizing Compressed Domain Video Bridging," 1995, p. 573-581, IEEE.
Van Hoff, Arthur et al., "Hooked on JAVA—Creating Hot Web Sites with JAVA Applets," 1996, Sun Microsystems, Inc., Addison-Wesley Publishing Company (197 pages).
Girdley, Michael et al., "Web Programming With Java," 1996, Sams.Net Publishing, Indianapolis, Indiana (512 pages).
Tung, Teck-Lee, "MediaBoard: A Shared Whiteboard Application for the Mbone," 1997, University of California, Berkeley (42 pages).
Parnes, Peter et al., "mMOD: the multicast Media-on-Demand system", Mar. 6, 1997, Lulea University of Technology, Sweden (6 pages).
Chawathe, Yatin et al., "A Proxy Architecture for Reliable Multicast in Heterogeneous Environments," 1998, p. 151-159, ACM Multimedia '98, Bristol, UK.
Ginsberg, Allen et al., "'The Little Web School House:' Using Virtual Rooms to Create a Multimedia Distance Learning Environment," 1998, p. 89-98, ACM Multimedia '98, Bristol, UK.
Schuett, Angela et al., "A Soft State Protocol for Accessing Multimedia Archives," 8th International Workshop on Network and Operating Systems Support for Digital Audio and Video, Jul. 8, 1998, p. 29-39, Systems Research Group, University of Cambridge, and Microsoft Research Limited, New Hall, Cambridge, UK (15 pages).
Chen, Herng-Yow et al., "Design of a Web-based Synchronized Multimedia Lecture System for Distance Education," 1999, p. 887-891, IEEE.
Liew, Soung C. et al., "Intellect: A System for Authoring, Distributing, and Presenting Multimedia Contents over The Internet," 1999, p. 62-66, IEEE.
Chiu, Patrick et al., "NoteLook: Taking Notes in Meetings with Digital Video and Ink," 1999, p. 149-158, ACM Multimedia '99, Orlando, Florida.
Chen, Herng-Yow et al., "An RTP-based Synchronized Hypermedia Live Lecture System for Distance Education," 1999, p. 91-99, ACM Multimedia '99, Orlando, Florida.
Boyer, David et al., "Virtual Social Clubs: Meeting Places for the Internet Community," 1999, p. 297-301, IEEE.
Heid, Jim, "RealProducer Plus G2", Jul. 31, 1999, Macworld (2 pages).
Li, Sheng-Tun et al., "A Presentation Semantic Model for Asynchronous Distance Learning Paradigm," 2000, p. 404-406, ACM Multimedia 2000, Los Angeles, California.
Chiueh, Tzi-Cker et al., "Lectern: A Digital Desk System for Video-Free Course-Lecture Capturing and Playback," 2000, p. 3-6, IEEE.

Macromedia Flash Player Web Archive, 2000, Macromedia, Inc. (27 pages). Retrieved from Internet: <https://web.archive.org>.
"RealProducer Plus User's Guide," 2000, RealNetworks, Inc., Seattle, Washington (120 pages).
Gastro, Paul et al., "Managing Context for Internet Videoconferences: The Multimedia Internet Recorder and Archive," Part of the IS&T/SPIE Conference on Multimedia Computing and Networking 2000, Jan. 2000, p. 142-153, SPIE vol. 3969.
Hauglid, Jon Olav et al., "WebSTAR—video database on WWW," Part of the IS&T/SPIE Conference on Multimedia Computing and Networking 2000, Jan. 2000, p. 274-281, SPIE vol. 3969.
Basso, A. et al., "PRISM, an IP-based architecture for broadband access to TV and other streaming media," 10th International Workshop on Network and Operating Systems Support for Digital Audio and Video, Jun. 26-28, 2000,The University of North Carolina at Chapel Hill and Microsoft Research, Cambridge, UK (11 pages).
"Live Broadcast Distribution with RealSystem Server 8," Dec. 7, 2000, RealNetworks, Inc., Seattle, Washington (30 pages).
Steinmetz, Arnd et al., "The e-Seminar Lecture Recording and Distribution System," 2001, p. 25-36, Multimedia Computing and Networking 2001, Proceedings of SPIE vol. 4312.
Dimitrova, Nevenka et al., "Personalizing Video Recorders using Multimedia Processing and Integration," Sep. 30-Oct. 5, 2001, p. 564-567, MM '01, ACM, Ottawa, Canada.
"Embedded RealPlayer Extended Functionality Guide," Sep. 25, 2001, RealNetworks, Inc., Seattle, Washington (140 pages).
Emond, Bruno et al., "A Broadband Web-based Application for Video Sharing and Annotation," Sep. 30-Oct. 5, 2001, p. 603-604, MM '01, ACM, Ottawa, Canada.
Guerri, Juan C. et al., "A Real Time E-Learning System Via Satellite Based on JMF and Windows Media," Dec. 1-6, 2002, p. 219-222, Multimedia '02, ACM, Juan-les-Pins, France.
Cutler, Ross et al., "Distributed Meetings: A Meeting Capture and Broadcasting System," Dec. 1-2, 2002, p. 503-512, Multimedia '02, ACM, Juan-les-Pins, France.
Towes, Kevin, Macromedia® Flash Communication Server MX, New Riders Publishing, Dec. 2002 (501 pages).
Doermann, D. et al., "Issues in the Transmission, Analysis, Storage, and Retrieval of Surveillance Video," 2003, p. 161-164, IEEE.
De Oliviera, Juavane C., "Java Multimedia Telecollaboration," Jul. 2003, p. 18-29, IEEE Computer Society.
Green, Tom et al., Building Dynamic Web Sites with Macromedia Studio MX, Nov. 2003, New Riders Publishing, Indianapolis, Indiana (566 pages).
"Logitech Brings the Power of Video to eBay Listings with Logitech VideoSnap; eBay Sellers Can Make Their Listings Even More Dynamic with Recorded Video Clips," Business Wire, Dec. 2, 2003 (1 page).
Shirmohammadi, Shervin et al., "An Approach for Recording Multimedia Collaborative Sessions: Design and Implementation," Feb. 2003 (20 pages).
Logitech VideoSnap, 2003, Logitech, Inc. (14 pages). Retrieved from Internet: <https://web.archive.org>.
Baer, Adam, "News Watch: Video; Will a Talking Head Charm the Online Bidder?," Feb. 19, 2004, The New York Times (1 page).
"RealProducers 11 User's Guide," Aug. 19, 2005, RealNetworks, Inc., Seattle, Washington (406 pages).
Hurwicz, Michael et al., Special Edition Using Macromedia Flash MX, Candace Hall et al. eds., 2003.
Towes, Kevin, Macromedia® Flash Communication Server MX, New Riders Publishing, Dec. 2002.
Crouch, Cameron, RealPlayer v. Windows Media: A Streaming Shootout, CNN, Jan. 28, 2000. Retrieved from Internet: <https://www.cnn.com/2000/TECH/computing/01/28/stream.shootout.idg/index.html>.
Strauss, Neil, Rolling Stones Live on Internet: Both a Big Deal and a Little Deal, New York Times, Nov. 22, 1994. Retrieved from Internet: <https://www.nytimes.com/1994/11/22/arts/rolling-stones-live-oninternet-both-a-big-deal-and-a-little-deal.html>.
Chambers, Mike, Macromedia Flash MX Security, Macromedia White Paper, Macromedia, Inc., Mar. 2002.
Press Release, Macromedia Previews New Server Technologies for Macromedia Flash, Macromedia, Inc., Mar. 4, 2002.

(56) References Cited

OTHER PUBLICATIONS

PCMag Encyclopedia definition of "browser plug-in," The Computer Language Co. Inc., 2020.
PCMag Encyclopedia definition of "HREF," The Computer Language Co. Inc., 2020.
GeeksforGeeks definition of "HTML src attribute," GeeksforGeeks, Sep. 20, 2019. Retrieved Aug. 13, 2020 from Internet: <https://www.geeksforgeeks.org/html-src-attribute/?ref=rp>.
HTMLQuick definition of "param element." Retrieved Aug. 25, 2020 from Internet: <https://www.htmlquick.com/reference/tags/param.html>.
File History of U.S. Pat. No. 9,467,728.
File History of U.S. Pat. No. 10,200,648.

* cited by examiner

REMOTELY ACCESSED VIRTUAL RECORDING ROOM

CROSS REFERENCE TO RELATED APPLICATIONS

This application is a continuation of U.S. patent application Ser. No. 16/865,756, filed May 4, 2020, which is a continuation of U.S. patent application Ser. No. 16/542,570, filed Aug. 16, 2019, which is a continuation of U.S. patent application Ser. No. 16/048,761, filed Jul. 30, 2018, now U.S. Pat. No. 10,674,109, issued Jun. 2, 2020, which is a continuation of U.S. patent application Ser. No. 14/843,457, filed Sep. 2, 2015, now U.S. Pat. No. 10,038,930, issued Jul. 31, 2018, which is a continuation of U.S. patent application Ser. No. 10/808,894, filed Mar. 24, 2004, now U.S. Pat. No. 9,161,068, issued Oct. 13, 2015, all of which are herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to a remotely accessed virtual recording room, and more particularly to an audio/video stream recording, storage, and delivery system and method.

BACKGROUND OF THE INVENTION

With the continual increase of online transactions there has been an increasing need to improve the capabilities of online business related communication. One area where this is particularly true is in competitive sale exchanges, such as online auctions. The greater a seller's ability to showcase products, the more successful their online auctions sales are bound to become. With the number of online auctions growing daily, sellers are continuously looking for ways to improve the success of these auctions. Sellers are continuously looking for techniques or technology that will enable them to better explain what the products are that they are selling to potential buyers, as well as why those potential buyers should want the seller's products. Sellers also want to be able to effectively demonstrate how their products work. Additionally, sellers sometimes need to be able to demonstrate the authenticity of their products. Accordingly, people are continuously looking for ways to enhance their product listings and sales volume.

Unfortunately, new systems and methods for increasing the capabilities of online business-related communications and transactions often result in increased intellectual complexity and/or increased computer system requirements. This tendency is undesirable because another main avenue for increasing the productively of online business-related communications and transactions is to increase the number of people who are participating in these online business-related transactions. Accordingly, it would be highly valuable if any new systems and methods for increasing the capabilities of online business-related communications and transactions also could be simple enough to help attract new users to the online business market and also not have extensive computer system requirements.

Accordingly, there has been a long existing need for a system that improves the level of communication possible with respect to online business-related transactions. Further, there is a continuing need for an improved system and/or method that is simple, efficient, and does not have extensive computer system requirements. Accordingly, those skilled in the art have long recognized the need for a system and method that addresses these and other issues.

SUMMARY OF THE INVENTION

Briefly, and in general terms, a preferred embodiment of the claimed invention resolves the above and other issues by providing an audio/video stream recording, storage, and delivery system. A preferred embodiment provides an Internet-based recording system that performs all audio and video stream recording over an Internet browser connection established between a user front end and a host back end. A host is this environment is generally defined as a company that is utilizing an audio/video stream recording, storage, and delivery system of the claimed invention. In one preferred embodiment, the system includes recording software, storage memory, a user interface, and a code generator.

Preferably, the recording software, which is located on the host back end, processes and records audio and video material that originates from the user front end and is streamed to the host back end. The storage memory, which is located on the host back end, then stores the recorded audio and video material. In a preferred embodiment, the user interface to the audio/video stream recording, storage, and delivery system provides a user at the user front end with remote access to a virtual recording room. The user interface further enables the user to record audio and video material streamed from the user front end by activating the recording software residing on the host back end. Advantageously, this is accomplished without requiring recording functionality on the user front end.

Preferably, the code generator produces code associated with the recorded audio and video material. The user interface is configured to facilitate easily copying and pasting the code to an additional location, such as an auction website. The code facilitates accessing the recorded audio and video material stored at the host back end from the additional location at which the code has been pasted. In this manner, activating the pasted code at the additional location provides access to the recorded audio and video material from the additional location while allowing the recorded audio and video material to remain stored at the host back end.

Additionally, another preferred embodiment of the claimed invention is directed towards an Internet-based recording method that performs all audio and video stream recording over an. Internet browser connection established between a user front end and a host back end. Preferably, the components required at the user front end include only a microphone, a camera, and access to the Internet browser. In one preferred embodiment, the method includes: (1) recording audio and video material over the Internet browser connection, wherein audio and video material originates on the user front end and is recorded on the host back end without requiring recording functionality on the user front end; (2) storing the recorded audio and video material on the host back end; and (3) providing access to the recorded audio and video material.

In accordance with one aspect of the preferred embodiment, the step of providing access to the recorded audio and video material includes enabling the recorded audio and video material on the host back end to be reviewed at the user front end. In accordance with another aspect of the preferred embodiment, the step of providing access to the recorded audio and video material includes enabling recorded audio and video material on the host back end to be re-recorded from the user front end. In accordance with still another aspect of the preferred embodiment, the step of providing access to the recorded audio and video material includes linking the recorded audio and video material stored at the host back end to a pointer that is located in at least one additional location, in response to input from the user front end. Accordingly, activating the pointer then provides access to the recorded audio and video material stored at the host back end. In one preferred embodiment, the pointer includes a hyperlink.

In accordance with another aspect of the preferred embodiment, the step of recording and storing the audio and video material further includes producing hypertext markup language code that is associated with the recorded and stored audio and video material. However, in other preferred embodiments of the invention, other coding languages (such as DHTML and the like) are utilized. This code facilitates accessing the recorded and stored audio and video material. In accordance with yet another aspect of the preferred embodiment, the step of providing access to the recorded audio and video material includes: enabling access to the recorded audio and video material stored at the host back end from an additional location by copying the hypertext markup language code produced at the host back end and pasting the hypertext markup language code to the additional location. In one preferred embodiment, the additional location is an auction web site.

In accordance with another aspect of the preferred embodiment, the step of providing access to the recorded audio and video material includes enabling recorded audio and video material on the host back end to be edited from the user front end. Preferably, recorded audio and video material includes a recorded audio portion and a recorded video portion. In one preferred embodiment, enabling recorded audio and video material on the host back end to be edited from the user front end includes, in response to input from the user front end, enabling audio material to be re-dubbed over the recorded audio portion of the recorded audio material while retaining the recorded video portion of the originally recorded audio and video material.

In accordance with another aspect of the preferred embodiment, the step of providing access to the recorded audio and video material includes, in response to input from the user front end, copying (or downloading) the recorded audio and video material stored at the host back end to at least one additional location. In accordance with still another aspect of the preferred embodiment, the step of providing access to the recorded audio and video material includes enabling additional audio material, video material, or audio and visual material to be attached to the recorded audio and video material stored on the host back end. In such a preferred embodiment, the additional audio material, video material, or audio and visual material originates from the user front end.

Another preferred embodiment of the claimed invention is also directed towards an Internet-based recording method that performs all audio and video recording functions over an Internet browser connection established between a user front end and a host back end. In this additional preferred embodiment, the method includes: (1) recording audio and video material over the Internet browser connection, wherein audio and video material originates on the user front end and is recorded on the host back end without requiring recording functionality on the user front end; (2) storing the recorded audio and video material on the host back end; (3) generating code associated with the recorded and stored audio and video material to facilitate accessing the recorded and stored audio and video material; and (4) enabling the generated code to be copied and pasted to an additional location, wherein activating the generated code provides access to the recorded audio and video material from the additional location. In one preferred embodiment, the generated code is hypertext markup language that is associated with, and linked to, the recorded and stored audio and video material. In this manner, the associated code facilitates access to the recorded and stored audio and video material from the additional location.

Yet another preferred embodiment of the claimed invention is directed towards a similar Internet-based recording method that performs all audio recording functions over an Internet browser connection established between a user front end and a host back end. In a preferred embodiment, the method includes: (1) uploading photographic still material to the host back end from the user front end; (2) recording audio material, over the Internet browser connection, to link the audio material with the photographic still material, wherein audio material originates from the user front end and is recorded on the host back end without requiring recording functionality on the user front end; (3) storing the recorded audio material and the linked photographic still material on the host back end; (4) generating code associated with the recorded audio material and the linked photographic still material to facilitate accessing the recorded audio material and the linked photographic still material; and (5) enabling the generated code to be copied and pasted to an additional location, wherein activating the generated code provides access to the recorded audio material and the linked photographic still material from the additional location.

Still another preferred embodiment of the claimed invention is directed towards a Wi-Fi (Wireless Fidelity, i.e., generally referring to any type of IEEE 802.11 network) recording method that performs at least part of the audio and video recording functions over a connection established between a user front end and a host back end. In such a preferred embodiment, the method includes recording audio and video material over a Wi-Fi connection using a personal digital assistant. The remainder of the Wi-Fi recording method is generally performed in a similar fashion to the Internet-based recording method described above.

Finally, another preferred embodiment of the claimed invention is directed towards a wireless mobile communications-based recording method that performs all (or at least part) of the audio and video recording functions over a wireless mobile connection established between a user front end and a host back end. In such a preferred embodiment, the method includes recording audio and video material over a wireless mobile connection. The remainder of the wireless mobile communications-based recording method is generally performed in a similar fashion to the Internet-based recording method described above.

Other features and advantages of the claimed invention of the present application will become apparent from the following detailed description, taken in conjunction with the achosting drawings, which illustrate by way of example, the features of the claimed invention.

DETAILED DESCRIPTION OF THE PREFERRED EMBODIMENTS

Figure 1:
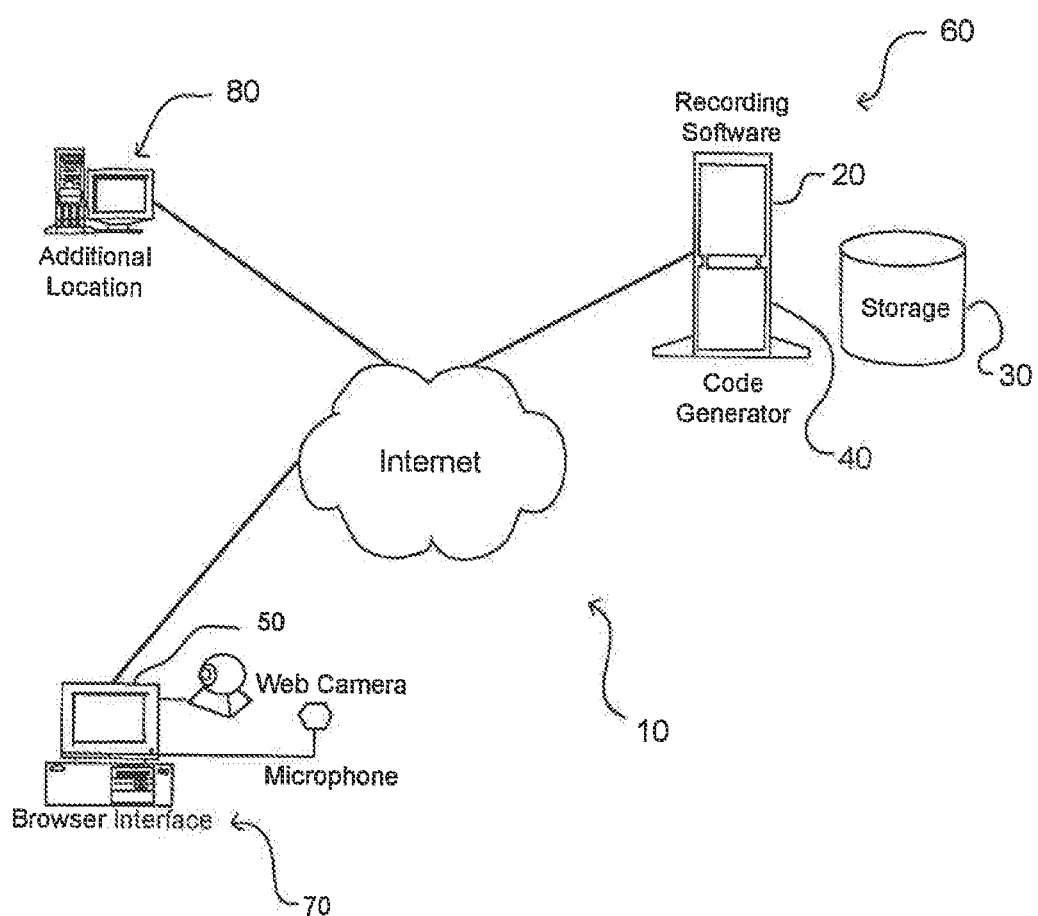
FIG. 1 illustrates an Internet based audio/video stream recording, storage, and delivery system that includes recording software, storage memory, a code generator, and a user interface, constructed in accordance with the claimed invention of the present application.
Figure 2:
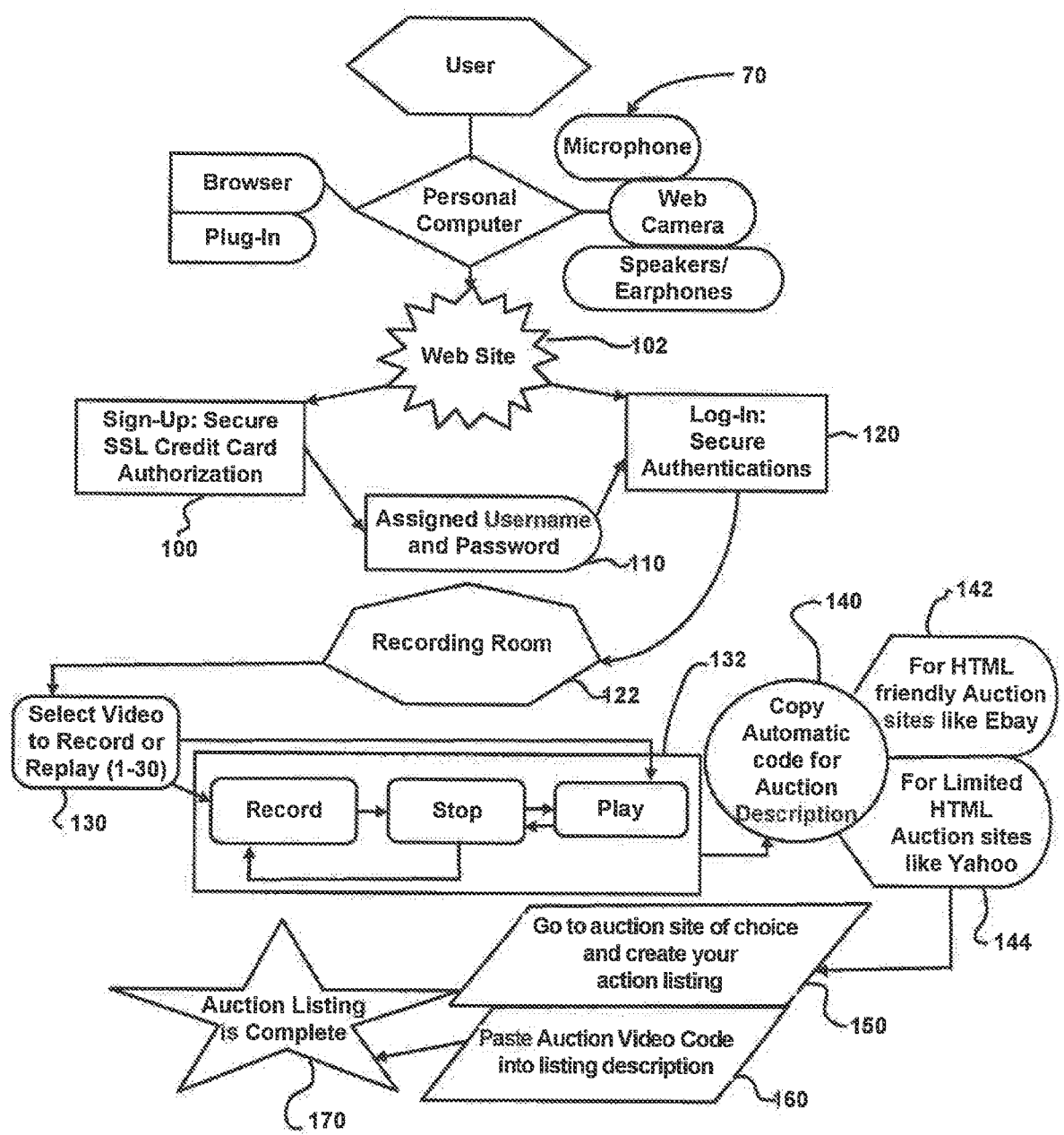
FIG. 2 illustrates an audio/video stream recording, storage, and delivery method, constructed in accordance with the claimed invention of the present application.

A preferred embodiment of the remotely accessed virtual recording room, constructed in accordance with the claimed invention, provides an audio/video stream recording, storage, and delivery system and method. A preferred embodiment of the claimed invention provides an Internet-based recording system that performs audio and video stream recording over an Internet browser connection established between a user front end and a host back end, without requiring any recording functionality at the user front end. Referring now to the drawings, wherein like reference numerals denote like or corresponding parts throughout the drawings, and more particularly to FIGS. 1-2, there is shown an audio/video stream recording, storage, and delivery system. Specifically, FIGS. 1-2 show a preferred embodiment of an audio/video stream recording, storage, and delivery system 10 that utilizes an Internet-based browser connection. In one preferred embodiment, the system 10 includes recording software 20, storage memory 30, a code generator 40, and a user interface 50. Advantageously, users of a preferred audio/video stream recording, storage, and delivery system 10 do not require any specific expertise, special software, local server space, or special equipment. In one preferred embodiment, the web-based audio/video stream recording, storage, and delivery system 10 is utilized in conjunction with online auctions, such as those available on eBay and Yahoo Auction.

While some preferred embodiments are described with respect to online auctions, those skilled in the art will appreciate that other preferred embodiments are utilized in conjunction with non-auction systems and services, without departing from the scope of the claimed invention. These other preferred embodiments may be either Internet-based, or alternatively may utilize some other type of network, including by way of example only and not by way of limitation, Wi-Fi systems, other wireless LAN (Local Area Network) systems, and mobile wireless communication systems.

In one preferred embodiment, the audio/video stream recording, storage, and delivery system 10 allows a user to quickly and easily record audio/video material, and place the material inside a third party online auction (e.g., eBay, Yahoo auctions, or international auction sites). Initially, a user accesses a web page that includes the user interface 50 of the recording, storage, and delivery system 10. The user interface 50 provides a virtual recording room for the user that is access through a web browser. As described above, no special software is needed in order to utilize the recording, storage, and delivery system 10 of the claimed invention beyond a standard web browser, such as is required to view any typical web page. This is in contrast to traditional video recording and player systems that typically require some type of additional "plug in" or other additional custom software application to be downloaded and installed locally. The only equipment required by the recording, storage, and delivery system 10 of the claimed invention is a simple web camera and microphone. The virtual recording room makes it easy for the user to sign up (e.g., create an account) and to start recording any number of audio/video streams. Preferably, the user can "retake" an audio/video stream as often as desired. The user interface 50 of the recording, storage, and delivery system 10 then provides the user with the code required to link and to allow access to the user's video from within the eBay or other online auction website with a simple click of a button. The audio/video streams created by the user are stored in storage memory 30, such as on a server, located at the host back end 60.

Preferably, the recording software 20 is located on the host back end 60 where it processes and records audio and video material that originates from the user front end 70 and is streamed to the host back end. The storage memory 30 (e.g., a server), which is also preferably located on the host back end 60, then stores the recorded audio and video material. In a preferred embodiment, the recorded audio and video material (e.g., audio/video streams) are stored on audio/video servers at the host back end 60, and thus, do not require that the user have access to local servers or any other type of local storage memory 30.

Preferably, the audio/video streams are immediately accessible for review using the system video player in the user interface 50 once the audio/video streams have been recorded. Additionally, in a preferred embodiment of the system 10, the user can also instantly update the audio/video streams using the virtual recording room of the user interface. Such an update includes, by way of example only and not by way of limitation, re-recording of the audio/video streams, editing of the audio/video streams, re-dubbing only the audio portion of the audio/video streams, attaching additional audio and/or video material to the original audio/video streams, and annotating the audio/video streams.

Preferably, the code generator 40 produces code associated with the recorded audio and video material. The code facilitates accessing the recorded audio and video material from any additional location 80 where the code has been pasted. Activating the code enables access to the recorded audio and video material stored on the servers 30, which are located at the host back end 60. Accordingly, with the click of a button, the necessary code is saved to the user's clipboard, where the code is ready to be easily pasted into a third-party website, such as the user's auction listing description. This code gives all the necessary information for a system video player to appear on the third-party website (e.g. an auction listings) and to show the user's recorded audio and video material.

As described above, in a preferred embodiment, the code produced is hypertext markup language code. Preferably, the code provides access to the recorded audio and video material by copying the hypertext markup language code produced at the host back end 60 and allowing the user to paste the hypertext markup language code to the additional location 80. In this manner, activating the pasted code at the additional location 80 provides access to the recorded audio and video material from the additional location 80 while allowing the recorded audio and video material to remain stored at the host back end 60. It will be appreciated however, that other coding languages that accomplish the same functionality may also be used, without departing some the scope of the claimed invention.

In a preferred embodiment, the user interface 50 to the audio/video stream recording, storage, and delivery system 10 provides a user at the user front end 70 with remote access to the virtual recording room. The user interface 50 further enables the user to record audio and video material streamed from the user front end 70 by activating the recording software 20, which is located on the host back end 60. The user interface 50 is configured to facilitate easily copying and pasting the code to an additional location 80, such as an auction website. Advantageously, this is accomplished without requiring recording functionality on the user front end 70. The user interface 50 only requires an Internet browser and standard Internet plug-ins.

A preferred embodiment includes a unique user interface 50 that facilitates the easy recording of any number of videos (either with or without accompanying audio), and thereafter placing these videos into online auction listings and auction stores. Preferably, the simplicity of the user interface 50 is achieved through the web-based, remotely accessible, virtual recording room. In a preferred embodiment, the user interface 50 enables a user to enter a virtual recording room in which the user can easily and intuitively select any number of audio/video streams, then record, playback, and/or re-record the audio/video streams as often as desired. The user interface 50 of the audio/video recording, storage, and delivery system 10 enables a user to place the code required for use by a third-party website, such as an auction site, on that third-party website using traditional copying and pasting techniques.

In a preferred embodiment, the user interface 50 provides access to the recording software 20, and in this manner, enables the recorded audio and video material stored on the host back end 60 to be reviewed at the user front end 70. This same access to recording software 20 via the user interface 50 also enables recorded audio and video material on the host back end 60 to be re-recorded from the user front end 70. Furthermore, user interface 50 facilitates linking the recorded audio and video material stored at the host back end 60 to a pointer residing at an additional location 80. Accordingly, activating the pointer preferably provides access to the recorded audio and video material stored at the host back end 60.

Another preferred embodiment of an Internet-based recording method performs all audio and video stream recording over an Internet browser connection established between a user front end 70 and a host back end 60. In one such embodiment, the method includes: (1) recording audio and video material over the Internet browser connection, wherein audio and video material originates on the user front end 70 and is recorded on the host back end 60 without requiring recording functionality residing on the user front end 70; (2) storing the recorded audio and video material on the host back end 60; and (3) providing access to the recorded audio and video material.

In a preferred embodiment, the method further includes enabling recorded audio and video material on the host back end 60 to be edited from the user front end 70. With respect to another aspect, the preferred method includes copying or downloading the recorded audio and video material stored at the host back end 60 to at least one additional location 80. Preferably, the method includes enabling additional audio material, video material, or audio/visual material to be uploaded and attached to the previously recorded audio and video material stored on the host back end 60. In such a preferred embodiment, the additional audio material, video material, or audio and visual material originates from the user front end 70.

A more comprehensive description of a preferred method for audio/video stream recording, storage, and delivery is described below, with respect to FIG. 2. At Step 100, a user signs up or otherwise creates an account on a website 102 that is utilizing the recording, storage, and delivery method of the claimed invention. Various techniques can be used to purchase use of the recording, storage, and delivery method through a web browser, including by way of example only, and not by way of limitation, credit card and PayPal transactions. At Step 110, a unique Username and Password are assigned to this user. This allows a unique virtual recording room to be created in the user interface 50 that is accessed using this Username and Password. Accordingly, at Step 120, the user can log in directly to his or her own personalized virtual recording room 122. The personalized virtual recording room includes an icon for each video that the user has purchased the right to record (i.e., if the user has purchased the right to record and store ten audio/video streams, there would be icons for audio/video streams 1-10 in the user's personalized virtual recording room). In a preferred embodiment, the virtual recording room in the user interface 50 further includes typical video player buttons 132, such as RECORD, PLAY, PAUSE, STOP, and volume control.

At Step 130, the user simply selects the video number that they desire to record in their recording room in order to begin the video recording process. The user then selects the RECORD button to record the selected video number. After the recording is complete, the user can play back the recorded audio/video stream to ensure satisfaction with the recorded material by pressing PLAY button. In a preferred embodiment, at Step 140, the user links their recorded audio/video material by clicking a code generator button, which generates a unique code for each recorded audio/video stream, and copies that code to the user's clipboard. This code is created differently, as described in further detail below, depending on whether the website at which the code is to be posted to is a full HTML (hypertext markup language) supported site 142 (such as eBay), or only a limited HTML supported site 144 (such as Yahoo Auction). At Step 150, the user then opens a website to which they wish to place their code, such as an eBay or Yahoo Auction webpage, and at Step 160, pastes the generated code into the respective additional location 80 at either eBay or Yahoo auction. Preferably, at Step 170, when the user completes the eBay or Yahoo submission, the video player utilized by the audio/video recording, storage, and delivery system 10 appears in the webpage, seamless with other items on the page.

A preferred embodiment of the audio/video recording, storage, and delivery system 10 utilizes a Flash recording application. Within the Flash recording application, a user who purchases multiple videos can select which video to record. Specifically, this application sends the user to a frame in the timeframe that includes the audio/video recorder and gives the application definitions of the stream number, which is equivalent to the video number. Preferably, the other variables have already been defined. These include by way of example only, and not by way of limitation, the height and width of the player, the location of the player, and the appInstance (application instance), which is passed through an ASP-generated flashvar (flash variable) in the HTML page.

Below are exemplary sample instructions that are utilized by the code generator 30, which are provided by way of example only, and not by way of limitation. These instructions create the text for easily pasting to an additional location 80, such as an online auction website.

The following preferred embodiment instructions are for full HTML auctions, such as eBay:

```
_root.createTextField("mytext",1,10,710,530,190);
//COPY BUTTON see http://www.auctionvideo.com/record_thirty_new.htm
_root.createTextFormat("myformat");
myformat = new TextFormat( );
myformat.color = 0x000000;
myformat.font = "Arial";
myformat.size = 10;
myformat.leading = "−1";
mytext.multiline = true;
mytext.wordWrap = true;
//text below
mytext.text = '<OBJECT classid="clsid:D27CDB6E-AE6D-11cf-96B8-444553540000"
codebase="http://download.macromedia.com/pub/shockwave/cabs/flash/swflash.cab#version=6,
0,0,0" WIDTH="'+swfWidth+'" HEIGHT= "'+swfHeight+'" id="play" ALIGN=""> <PARAM
NAME="FlashVars"
VALUE="appInstance='+appInstance+'&streamNumber='+streamNumber+'"> <PARAM
NAME=movie VALUE="'+swfLocation+'play.swf'"> <PARAM NAME=quality
VALUE=high> <PARAM NAME=bgcolor VALUE=#FFFFFF> <EMBED
src="'swfLocation+'play.swf'"
FLASHVARS="appInstance='+appInstance+'&streamNumber='+streamNumber+'" quality=high
bgcolor=#FFFFFF WIDTH="'+swfWidth+'" HEIGHT="'+swfHeight+'" NAME="play"
ALIGN=""TYPE="application/x-shockwave-flash"
PLUGINSPAGE="http://www.macromedia.com/go/getflashplayer"></EMBED></OBJECT>';
mytext.setTextFormat(myformat);
```

The following preferred embodiment instructions are for limited HTML auctions, such as Yahoo Auction:

```
_root.createTextField("yahootext",4,750,250,400,400);
//COPY BUTTON see http://www.auctionvideo.com/record_thirty_new.htm
//text below
yahootext.text = '<a
href="http://www.auctionvideo.com/player.htm?appInstance='+appInstance+'&streamNumber='
+streamNumber+'"><img src="http://www.auctionvideo.com/auctionvideobutton.jpg"
width="400" height="108" border="0"></a>';
yahootext.setTextFormat(myformat);
```

Below are exemplary sample instructions that are utilized by the user interface 50, which are provided by way of example only, and not by way of limitation. These instructions are used to copy the generated code onto additional locations 80, such as auction websites. In a preferred embodiment, the FSCommand action is used to implement javaScript, Visual Basic, and ActionScript, which automatically places the generated HTML code into the user's clipboard.

The following preferred embodiment instructions are the ActionScript (button) instructions:

```
on(release){
    fscommand("myCopyCBFunction", mytext.text);
}
```

The following preferred embodiment instructions are the Visual Basic instructions:

```
<SCRIPT LANGUAGE="VBScript">
<!--
// Catch FS Commands in IE, and pass them to the corresponding JavaScript function.
Sub testmovie_FSCommand(ByVal command, ByVal args)
    call testmovie_DoFSCommand(command, args)
end sub
// -->
</SCRIPT>
```

The following preferred embodiment instructions are the JavaScript instructions:

```
<SCRIPT LANGUAGE="JavaScript">
<!--
function testmovie_DoFSCommand(command, args) {
    if(command == "myCopyCBFunction") {
        window.clipboardData.setData('Text', args);
    }
}
```

Another preferred embodiment of an audio/video stream recording, storage, and delivery method is particularly advantageous for users without access to a web camera or for users with a slow Internet connection. In such a preferred method, the user simply uploads one or more previously recorded digital still images to the storage memory 30, (i.e., servers) located at the host back end 60. In one embodiment that is utilized in conjunction with an online auction, these previously recorded digital still images are of the item(s) that the user is selling. After the digital still images have been uploaded, the user enters the virtual recording room in the user interface 50. Next, the user selects the RECORD button, and moves through the images one by one while providing a streaming audio description of each photo that is recorded by the storage memory 30 at the host back end 60. As the audio is streamed to the host server 30, the recording software 20 tracks the correlation between the images and the audio being recorded. After the "slide show" of still pictures and associated audio material has been recorded, the user can review, record, and/or edit their show, just as in the previous preferred embodiment. When the user is satisfied, the user selects a "copy code" button, just as in the previous preferred embodiment. This prepares the HTML code to be pasted into a website at an additional location 80, such as the auction description at an auction website.

In one preferred embodiment, this audio/video stream recording, storage, and delivery method is configured such that, as soon as a viewer accesses the auction webpage for that particular item, the recording, storage, and delivery method begins playing this "slide show." Preferably, the viewer can replay the "slide show" after it has finished, as many times as desired.

The following instructions are for the audio record/still upload preferred embodiment method:

```
_global.conn_nc = new NetConnection( );
_global.server="xxx.xxx.xxx.xxx";
_global.picXML_xml=new XML( );
_global.XML_URL="http://www.auctionvideo.com/uploads/"+appInstance+".xml";
_global.picture_array=new Array( );
_global.curPic=0;
_global.recording=false;
_global.recordLimitSeconds=60;
_global.mic_mic=Microphone.get( );
mic_mic.setRate(11);
conn_nc.onStatus = function(info) {
    var infomsg = info.code;
    trace(infomsg);
    if (infomsg == "NetConnection.Connect.Success") {
        goGetTheStream(this);
        getTheSO(this);
    } else if (infomsg ==. "NetConnection.Connect.Rejected") {
    } else if (infomsg == "NetConnection.Connect.Closed") {
    } else if (infomsg == "NetConnection.Connect.Failed") {
    };
};
picXML_xml.ignoreWhite=true;
picXML_xml.onLoad=function(suc) {
    if(suc) {
        _global.URL="rtmp.//"+server+"/ebay2/"+appInstance;
        for(i=0 ;this.firstChild.childNodes[i]!=null;i++){
            o=new Object( );
            o.jpegurl=this.firstChild.childNodes[i].attributes.jpegurl;
            o.picnum=this.firstChild.childNodes[i].attributes.picnum;
            picture_array.push(o);
        }
        _global.maxPic=picture_array.length;
        loadJPG( );
        conn_nc.connect(URL);
    } else {
        trace("load failed");
    }
}
setW = f_mc._width;
setH = f_mc._height;
_global.wOffset=f_mc._x;
_global.hOffset=f_mc._y;
back or forward too far
_global.loadJPG = function( ) {
    _root.createEmptyMovieClip("jpgLoader_mc", 50);
    jpgLoader_mc.loadMovie("http://www.auctionvideo.com/uploads
/"+appInstance+"/"+picture_array[curPic].jpegurl);
    _root.onEnterFrame = function( ) {
        if ((jpgLoader_mc.getBytesLoaded( )>4) && (jpgLoader_mc.getBytesLoaded( )
== jpgLoader_mc.getBytesTotal( ))) {
            _root.onEnterFrame = null;
            jpgW = jpgLoader_mc._width;
            jpgH = jpgLoader_mc._height;
            if (jpgW>setW || jpgH>setH) {
                overW = jpgW-setW;
                overH = jpgH-setH;
                if (overW>overH) {
                    perc = jpgW/setW;
                    jpgLoader_mc._width = jpgW/perc;
                    jpgLoader_mc._height = jpgH/perc;
                    newH = jpgLoader_mc._height;
```

-continued

```
                    jpgLoader_mc._y = ((setH/2)-
(Math.round(newH/2)))+hOffset;
                    jpgLoader_mc._x = wOffset;
                } else {
                    perc = jpgH/setH;
                    jpgLoader_mc._width = jpgW/perc;
                    jpgLoader_mc._height = jpgH/perc;
                    newW = jpgLoader_mc._width;
                    jpgLoader_mc._y = hOffset;
                    jpgLoader_mc._x = ((setW/2)-
(Math.round(newW/2)))+wOffset;
                }
            } else {
                newH = jpgLoader_mc._height;
                jpgLoader_mc._y = ((setH/2)-(Math.round(newH/2)))+hOffset;
                newW = jpgLoader_mc._width;
                jpgLoader_mc._x = ((setW/2)-(Math.round(newW/2)))+wOffset;
            }
        }
    };
    checkButtons( );
};
_global.goGetTheStream=function(nc) {
    _global.slideShow_ns=new NetStream(nc);
    slideShow_ns.attachAudio(mic_mic);
}
_global.getTheSO=function(nc) {
    _global.slideShow_so=SharedObject.getRemote("slideShow",nc.uri,true);
    slideShow_so.onSync=function( ) {
        trace("all connected up");
    }
    slideShow_so.connect(nc);
}
_global.checkButtons=function( ) {
    if(curPic+1 ==maxPic) {
        a_pb.setEnabled(false);
    } else {
        a_pb.setEnabled(true);
    }
    if(curPic==0) {
        b_pb.setEnabled(false);
    } else {
        b_pb.setEnabled(true);
    }
}
_global.changeNum=function(a) {
    a=(Math.round(a*100)/100);
    return a;
}
function nextClick( ) {
    if(recording==true) {
        tempObj =new Object( );
        tempObj.clickTime=changeNum(slideShow_ns.time);
        tempObj.direction="next";
        clickHolder_array.push(tempObj);
        delete tempObj;
    }
    curPic++;
    loadJpg( );
}
function backClick( ) {
    if(recording==true)
        tempObj=new Object( );
        tempObj.clickTime=changeNum(slideShow_ns.time);
        tempObj.direction="back";
        clickHolder_array.push(tempObj);
        delete tempObj;
    }
    curPic--;
    loadJpg( );
}
```

```
function saveClick(comp) {
    if(comp.getLabel( )="Record"){
        publishTheAudio( );
        comp.setLabel("Stop");
    } else {
        saveTheData( );
        comp.setLabel("Record");
    }
}
_global.publishTheAudio=function( ){
    recording=true;
    _global.clickHolder_array=new Array( );
    slideShow_ns.publish(appInstance, "record");
    clearInterval(recordTimerInterval);
    _global.recordTimerInterval=setInterval(stopRecording,recordLimitSeconds*1000);
}
_global.stopRecording=function( ) {
    saveTheData( );
    s_pb.setLabel("Record");
}
_global.saveTheData=function( ) {
    clearInterval(recordTimerInterval);
    slideShow_so.data.slideShow=clickHolder_array;
    recording=false;
    slideShow_ns.publish(false);
    delete clickHolder_array;
    curPic=0;
    loadJpg( );
}
a_pb.setClickHandler("nextClick");
b_pb.setClickHandler("backClick");
s_pb.setClickHandler("saveClick");
picXML_xml.load(XML_URL);
stop( );
```

Figure 3:
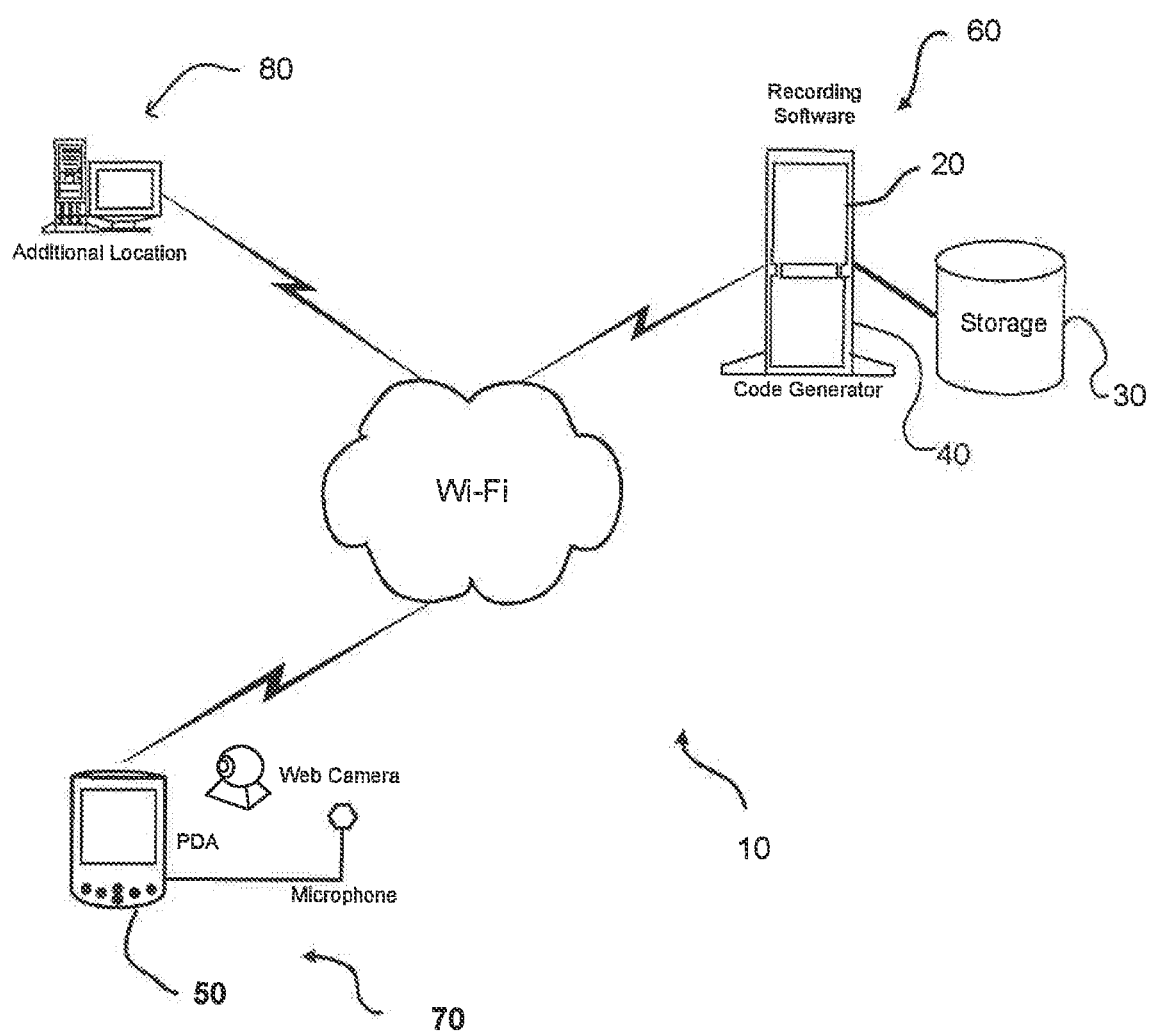
FIG. 3 illustrates a Wi-Fi based audio/video stream recording, storage, and delivery system that includes recording software, storage memory, a code generator, and a user interface, constructed in accordance with the claimed invention of the present application.
Figure 4:
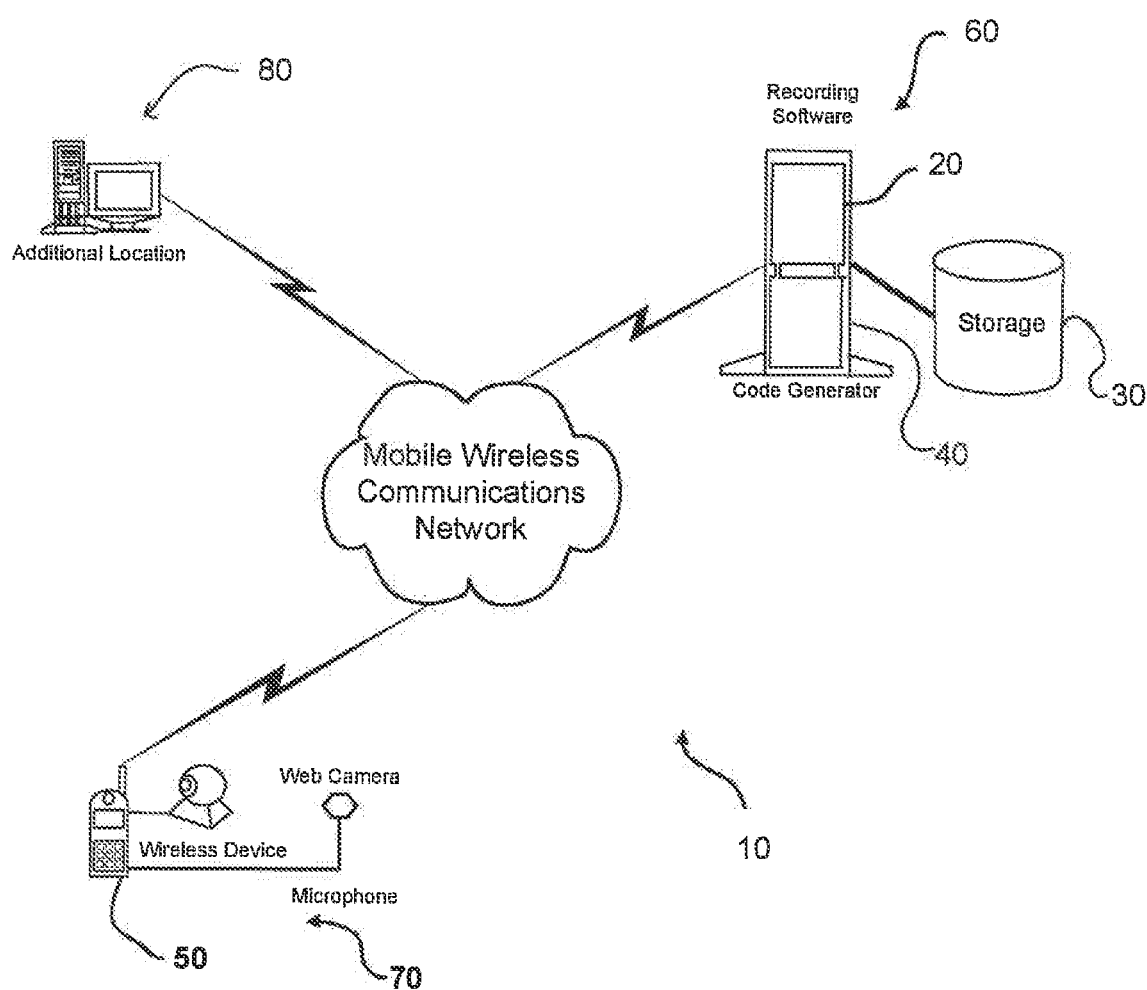
FIG. 4 illustrates a mobile wireless communication based audio/video stream recording, storage, and delivery system that includes recording software, storage memory, a code generator, and a user interface, constructed in accordance with the claimed invention of the present application.

As mentioned above, other preferred embodiments may utilize other types of communication networks, including by way of example only and not by way of limitation, Wi-Fi systems, other wireless LAN systems, and mobile wireless communication systems. In the preferred embodiment shown in FIG. 3, a Wi-Fi based recording method performs at least part of the audio and video recording functions over a Wi-Fi connection established between a user front end 70 and a host back end 60. In such a preferred embodiment, the method includes recording audio and video material over a Wi-Fi connection using a personal digital assistant. In some preferred embodiments, the method includes recording audio and video material over a combined Wi-Fi and Internet network connection. Finally, in another preferred embodiment shown in FIG. 4, a wireless mobile communications-based recording method performs all audio and video recording functions over a wireless mobile connection established between a user front end 70 and a host back end 60. The remainder of the Wi-Fi based recording method and the mobile communications-based recording method are generally performed in a corresponding manner to the Internet-based recording method described above.

Furthermore, the various methodologies described above are provided by way of illustration only and should not be construed to limit the invention. Those skilled in the art will readily recognize that various modifications and changes may be made to the claimed invention of the present application without departing from the true spirit and scope of the claimed invention. Accordingly, it is not intended that the claimed invention be limited, except as by the appended claims.

What is claimed is:

1. A secure distributed digital audio and digital video recording system, comprising:

an application configured to operate on a mobile front end digital audio and digital video capturing device; and a host back end application server system comprising one or more host back end application servers, wherein in response to an interaction with a user, the host back end application server system delivers to the application, each time recording of digital audio and digital video material is sought to be initiated, a stream number that is associated with an account of the user, wherein the application is configured to use the stream number to initiate secure streaming of digital audio and digital video material to the host back end application server system, wherein the digital audio and digital video material is not stored as a complete file on the mobile front end digital audio and digital video capturing device prior to initiation of the secure streaming of the digital audio and digital video material to the host back end application server system, wherein the application is configured to use a secure real time messaging protocol to securely stream the digital audio and digital video material from the mobile front end digital audio and digital video capturing device over at least a packet-based network connection to the host back end application server system, as the digital audio and digital video material is being captured by the mobile front end digital audio and digital video capturing device, wherein the application is capable of securely streaming the digital audio and digital video material without requiring local installation and concurrent execution on the mobile front end digital audio and digital video capturing device of an additional custom recording software application that is configured to record digital audio and digital video material as a complete file to a local storage memory, and wherein at least one host back end application server records the digital audio and digital video material securely streamed from the mobile front end digital audio and digital video capturing device.

2. The secure distributed digital audio and digital video recording system of claim 1, wherein the account is secured by a unique username and password assigned to the user.

3. The secure distributed digital audio and digital video recording system of claim 2, wherein the application is configured to provide secure authentication in response to receiving from the user a log-in supplying the unique username and password.

4. The secure distributed digital audio and digital video recording system of claim 1, wherein the host back end application server system is configured to provide variable definitions associated with the stream number, and wherein the variable definitions include at least one of height of a player, width of a player, location of a player, or application instance.

5. The secure distributed digital audio and digital video recording system of claim 1, wherein the stream number is unique to the digital audio and digital video material securely streamed from the mobile front end digital audio and digital video capturing device.

6. The secure distributed digital audio and digital video recording system of claim 1, wherein at least a portion of the packet-based network connection is established at least in part by means of an Institute of Electrical and Electronics Engineers 802.11 compliant local area network protocol.

7. The secure distributed digital audio and digital video recording system of claim 1, wherein the host back end application server system comprises at least one host back end application server that first processes the recorded digital audio and digital video material and then stores the recorded digital audio and digital video material in a memory repository.

8. The secure distributed digital audio and digital video recording system of claim 1, wherein the host back end application server system receives the streamed digital audio and digital video material via wireless communication.

9. The secure distributed digital audio and digital video recording system of claim 1, wherein the digital audio and digital video material is viewable on a mobile computing device, which is either the mobile front end digital audio and digital video capturing device or a mobile computing device that is not the mobile front end digital audio and digital video capturing device, as the mobile front end digital audio and digital video capturing device captures the digital audio and digital video material.

10. The secure distributed digital audio and digital video recording system of claim 1, wherein the host back end application server system comprises at least one host back end application server that streams the digital audio and digital video material to one or more other devices configured to display streaming digital audio and digital video content.

11. The secure distributed digital audio and digital video recording system of claim 1, wherein the application provides a graphical user interface that is configured to, in response to user interaction with the graphical user interface, provide at least one host back end application server in the host back end application server system with at least one instruction to at least one of:
begin recording the streaming digital audio and digital video material,
enable remote annotation of the recorded digital audio and digital video material, or
share access to the digital audio and digital video material with one or more devices configured to display streaming digital audio and digital video material.

12. The secure distributed digital audio and digital video recording system of claim 1, wherein the host back end application server system comprises at least one host back end application server that generates a hypertext-based programming code associated with, pointing to, or linked to, the recorded digital audio and digital video material for sharing access to the recorded digital audio and digital video material with one or more devices configured to display streaming digital audio and digital video material, and
wherein the hypertext-based programming code comprises at least a portion of a universal resource locator that points to, is associated with, or is linked to the recorded digital audio and digital video material.

13. The secure distributed digital audio and digital video recording system of claim 12, wherein the hypertext-based programming code associated with, pointing to, or linked to, the recorded digital audio and digital video material comprises at least one instruction configured to facilitate embedding of the recorded digital audio and digital video material in a webpage, and
wherein the secure distributed digital audio and digital video recording system further comprises means for copying the hypertext-based programming code associated with, pointing to, or linked to, the recorded digital audio and digital video material.

14. The secure distributed digital audio and digital video recording system of claim 12, wherein the hypertext-based programming code associated with, pointing to, or linked to, the recorded digital audio and digital video material further comprises at least one instruction related to at least one of (i) annotation of the recorded digital audio and digital video material, (ii) display resolution of the digital video material, or (iii) the annotation of the recorded digital audio and digital video material and the display resolution of the digital video material.

15. A host back end application server system for recording digital audio and digital video material, comprising:
one or more application servers at a host back end,
wherein, in response to input from a user, at least one of the one or more application servers delivers over a packet-based network connection to a mobile front end digital audio and digital video capturing device, each time recording of digital audio and digital material is sought to be initiated, a stream number that is associated with an account of the user,
wherein at least one of the one or more application servers begins receiving, over the packet-based network connection and according to a secure real time messaging protocol, streaming digital audio and digital video material as the digital audio and digital video material is being captured by the mobile front end digital audio and digital video capturing device, and before any storage as a complete file of the streamed digital audio and digital video material on the mobile front end digital audio and digital video capturing device is complete, and
wherein, after the streamed digital audio and digital video material is received in full, at least one of the one or more application servers stores the securely streamed digital audio and digital video material.

16. The host back end application server system of claim 15, wherein the one or more application servers facilitate streaming of the digital audio and digital video material without requiring local installation and concurrent execution on the mobile front end digital audio and digital video capturing device of an additional custom recording software application that is configured to record digital audio and digital video material as a complete file to a local storage memory.

17. The host back end application server system of claim 15, wherein the one or more application servers facilitate initiation of streaming of the digital audio and digital video material before any storage of the streamed digital audio and digital video material as a complete sequentially stored file on the mobile front end digital audio and digital video capturing device is complete.

18. The host back end application server system of claim 15, wherein the account is secured by a unique username and password assigned to the user, and wherein the stream number is unique to the securely streamed digital audio and digital video material.

19. The host back end application server system of claim 15, wherein at least one of the one or more application servers is configured to provide variable definitions associated with the stream number, and wherein the variable definitions include at least one of height of a player, width of a player, location of a player, or application instance.

20. The host back end application server system of claim 15, wherein at least a portion of the packet-based network connection is established at least in part by means of an Institute of Electrical and Electronics Engineers 802.11 compliant local area network protocol.

21. The host back end application server system of claim 15, wherein the recorded digital audio and digital video material is processed by at least one of the one or more application servers prior to being stored in a memory repository.

22. The host back end application server system of claim 15, wherein at least one of the one or more application servers receives the streamed digital audio and digital video material via wireless communication.

23. The host back end application server system of claim 15, wherein at least one of the one or more application servers streams digital audio and digital video material to devices capable of displaying streamed digital audio and digital visual material.

24. The host back end application server system of claim 15, wherein at least one of the one or more application servers generates a hypertext-based programming code associated with, pointing to, or linked to, the recorded digital audio and digital video material for sharing access to the recorded digital audio and digital video material with one or more devices configured to display streaming digital audio and digital video material, and
wherein the hypertext-based programming code comprises at least a portion of a universal resource locator that points to, is associated with, or is linked to the recorded digital audio and digital video material.

25. The host back end application server system of claim 24, wherein the hypertext-based programming code associated with, pointing to, or linked to, the recorded digital audio and digital video material comprises at least one instruction configured to facilitate embedding of the recorded digital audio and digital video material in a webpage, and
wherein the host back end application server system further comprises means for copying the hypertext-based programming code associated with, pointing to, or linked to, the recorded digital audio and digital video material.

26. The host back end application server system of claim 24, wherein the hypertext-based programming code associated with, pointing to, or linked to, the recorded digital audio and digital video material further comprises at least one instruction related to at least one of (i) annotation of the recorded digital audio and digital video material, (ii) display resolution of the digital video material, or (iii) the annotation of the recorded digital audio and digital video material and the display resolution of the digital video material.

27. A secure distributed digital audio and digital video recording system, comprising:
a computer processor executing software for secure streaming of digital audio and digital video material from a mobile front end digital audio and digital video capturing device; and
a storage device for recording at a host back end the digital audio and digital video material securely streamed from the mobile front end digital audio and digital video capturing device,
wherein in response to an interaction with a user, the storage device delivers to the computer processor, each time recording of digital audio and digital video material is sought to be initiated, a stream number that is associated with an account of the user,
wherein the computer processor is configured to use the stream number to initiate secure streaming of digital audio and digital video material to the host back end,
wherein the digital audio and digital video material is not stored as a complete file on the mobile front end digital audio and digital video capturing device prior to initiation of the secure streaming of the digital audio and digital video material to the host back end,
wherein the computer processor is configured to use a secure real time messaging protocol to securely stream the digital audio and digital video material from the mobile front end digital audio and digital video capturing device over at least a packet-based network connection to the host back end, as the digital audio and digital video material is being captured by the mobile front end digital audio and digital video capturing device, and
wherein the computer processor is capable of securely streaming the digital audio and digital video material without requiring local installation and concurrent execution on the mobile front end digital audio and digital video capturing device of an additional custom recording software application that is configured to record digital audio and digital video material as a complete file to a local storage memory.

28. The secure distributed digital audio and digital video recording system of claim 27, wherein the account is secured by a unique username and password assigned to the user, and wherein the stream number is unique to the securely streamed digital audio and digital video material.

29. A method for distributed digital audio and digital video recording, comprising:
delivering, in response to input from a user, over a packet-based network connection from one or more application servers at a host back end to a mobile front end digital audio and digital video capturing device, each time recording of digital audio and digital material is sought to be initiated, a stream number that is associated with an account of the user;
commencing receipt of, over the packet-based network connection and according to a secure real time messaging protocol, streaming digital audio and digital video material by at least one of the one or more application servers as the digital audio and digital video material is being captured by the mobile front end digital audio and digital video capturing device, and before any storage as a complete file of the streamed digital audio and digital video material on the mobile front end digital audio and digital video capturing device is complete; and storing, after the streamed digital audio and digital video material is received in full, to at least one of the one or more application servers, the securely streamed digital audio and digital video material.

30. The method for distributed digital audio and digital video recording of claim 29, wherein the account is secured by a unique username and password assigned to the user, and wherein the stream number is unique to the securely streamed digital audio and digital video material.

\* \* \* \* \*